(12) United States Patent
Royer, Jr. et al.

(10) Patent No.: US 8,244,970 B2
(45) Date of Patent: Aug. 14, 2012

(54) CACHE WRITE INTEGRITY LOGGING

(75) Inventors: Robert J. Royer, Jr., Portland, OR (US); Richard L. Coulson, Portland, OR (US)

(73) Assignee: Intel Corporation, San Jose, CA (US)

( * ) Notice: Subject to any disclaimer, the term of this patent is extended or adjusted under 35 U.S.C. 154(b) by 0 days.

(21) Appl. No.: 13/074,870

(22) Filed: Mar. 29, 2011

(65) Prior Publication Data

US 2011/0238918 A1 Sep. 29, 2011

Related U.S. Application Data

(63) Continuation of application No. 11/856,258, filed on Sep. 17, 2007, now Pat. No. 7,937,524, which is a continuation of application No. 10/607,772, filed on Jun. 27, 2003, now Pat. No. 7,299,379.

(51) Int. Cl.
*G06F 12/00* (2006.01)
(52) U.S. Cl. ...................................................... 711/104
(58) Field of Classification Search .................. None
See application file for complete search history.

(56) References Cited

U.S. PATENT DOCUMENTS

| | | | |
|---|---|---|---|
| 5,359,713 A | 10/1994 | Moran et al. | |
| 5,603,331 A | 2/1997 | Heemels et al. | |
| 5,732,238 A | 3/1998 | Sarkozy | |
| 5,937,433 A | 8/1999 | Lee et al. | |
| 6,148,368 A | 11/2000 | DeKoning | |
| 6,446,141 B1 | 9/2002 | Nolan et al. | |
| 6,629,198 B2 | 9/2003 | Howard et al. | |
| 6,640,278 B1 | 10/2003 | Nolan et al. | |
| 7,277,993 B2 * | 10/2007 | Garney | 711/143 |
| 7,299,379 B2 | 11/2007 | Royer, Jr. et al. | |
| 7,937,524 B2 | 5/2011 | Royer, Jr. et al. | |
| 2004/0268026 A1 | 12/2004 | Royer, Jr. et al. | |
| 2008/0010401 A1 | 1/2008 | Royer, Jr. et al. | |

FOREIGN PATENT DOCUMENTS

| | | |
|---|---|---|
| WO | WO-2005006196 A2 | 1/2005 |
| WO | WO-2005006196 A3 | 1/2005 |

OTHER PUBLICATIONS

"Chinese Application Serial No. 200480014334.9, Office Action Received mailed May 30, 2008", OAR-MISC, 18 pgs.
"Chinese Application Serial No. 200480014334.9, Response filed Aug. 4, 2008 to Office Action mailed May 30, 2008", 9 pgs.

(Continued)

*Primary Examiner* — Hiep Nguyen
(74) *Attorney, Agent, or Firm* — Schwegman, Lundberg & Woessner, P.A.

(57) ABSTRACT

An apparatus, as well as systems, methods, and articles can operate to record the address of write operations to a memory cached by a non-volatile cache prior to executing an operating system cache driver. In an embodiment, a non-volatile cache may be implemented by creating a device option read only memory (ROM), or modifying the associated computer basic input-output system (BIOS) to trap software interrupts associated with disk and other media access requests. Associated addresses, such as logical block addresses, can be stored in a log for data that is modified. The resulting log can be stored in a non-volatile medium, including the cache itself. If the available log space is not large enough to record all write activity prior to loading operating system drivers, a flag may be set to indicate the overrun condition.

21 Claims, 2 Drawing Sheets

OTHER PUBLICATIONS

"International Application No. PCT/US2004/018411, International Search Report and Written Opinion mailed Dec. 7, 2005", 11 pgs.
Handy, Jim, "Introduction to the First Edition.", The Cache Memory Book, Academic Press, 2nd Edition, (1998), xv.
Kozierok, C., "PC Guide", Logical Block Addressing,, http://www.pcguide.com/ref/hdd/bios/modesLBA-c.html, (Apr. 17, 2001).
Kozierok, C., "PC Guide", BIOS Functions and Operation, http://www.pcguide.com/ref/mbsys/bios/func.html, (Apr. 17, 2001).

* cited by examiner

CACHE WRITE INTEGRITY LOGGING

CONTINUATION APPLICATION

This application is a continuation of U.S. application Ser. No. 11/856,258, filed Sep. 17, 2007, which is a continuation of U.S. application Ser. No. 10/607,772, filed on Jun. 27, 2003, now issued as U.S. Pat. No. 7,299,379, which are incorporated herein by reference in their entirety.

TECHNICAL FIELD

Various embodiments described herein relate generally to apparatus, systems, and methods used to maintain the integrity of data stored in a memory, including cached data.

BACKGROUND INFORMATION

A computer memory cache may operate using volatile or non-volatile memory. When volatile memory is used, caching policies usually (i.e., since the cache state is reset during each boot) include a mechanism to flush the cache before associated cache driver software acts to access the cache. Access requests to the cached medium that are made prior to loading and executing the driver software can thus be prevented from corrupting cached data.

While it can be advantageous to use non-volatile memory in a cache (e.g., the cache state can be maintained during system shutdown or a power failure), implementation problems may arise. For example, write requests associated with data stored in a non-volatile cache that occur prior to loading the cache driver may result in data corruption once the driver boots. Invalidating the non-volatile cache after the driver begins execution may avoid data corruption, but the advantage of a persistent cached data state is lost.

DETAILED DESCRIPTION

In the following detailed description of various embodiments, reference is made to the accompanying drawings that form a part hereof, and in which are shown by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

In some embodiments, a non-volatile cache may be implemented by creating a device option read only memory (ROM or OROM), or modifying the related computer basic input-output system (BIOS) to trap software interrupts (e.g., the BIOS Intl3h interface of Intel® x86-compatible machines) associated with disk access requests. Disk write activity can be detected in this manner, and associated addresses can be stored in a log for all modified data addresses (e.g., logical block addresses, or LBAs). This "write log" can be stored in a non-volatile medium, along with the cache itself. If the write log does not have enough space to record all disk write activity prior to loading the operating system (OS) drivers (e.g., the OS storage subsystem drivers), a flag may be set to indicate the overrun condition. The flag may be included in the log, or stored in another memory, which may be volatile or nonvolatile.

Once the OS storage subsystem drivers load, they may query the write log and invalidate or update any data in the cache that has been changed, as indicated by the write log. If the write log overrun flag is set, the driver can update all data in the cache from currently available disk data, or invalidate the entire cache, so that no data loss will occur, since the disk will always have the correct version of the data stored. After the driver successfully flushes all data associated with the addresses in the write log, the log may be cleared to an empty state. If the cache policy permits dirty data (i.e., writeback policies), the option read only memory (OROM) may operate to flush all dirty data before allowing the system to boot.

Figure 1:
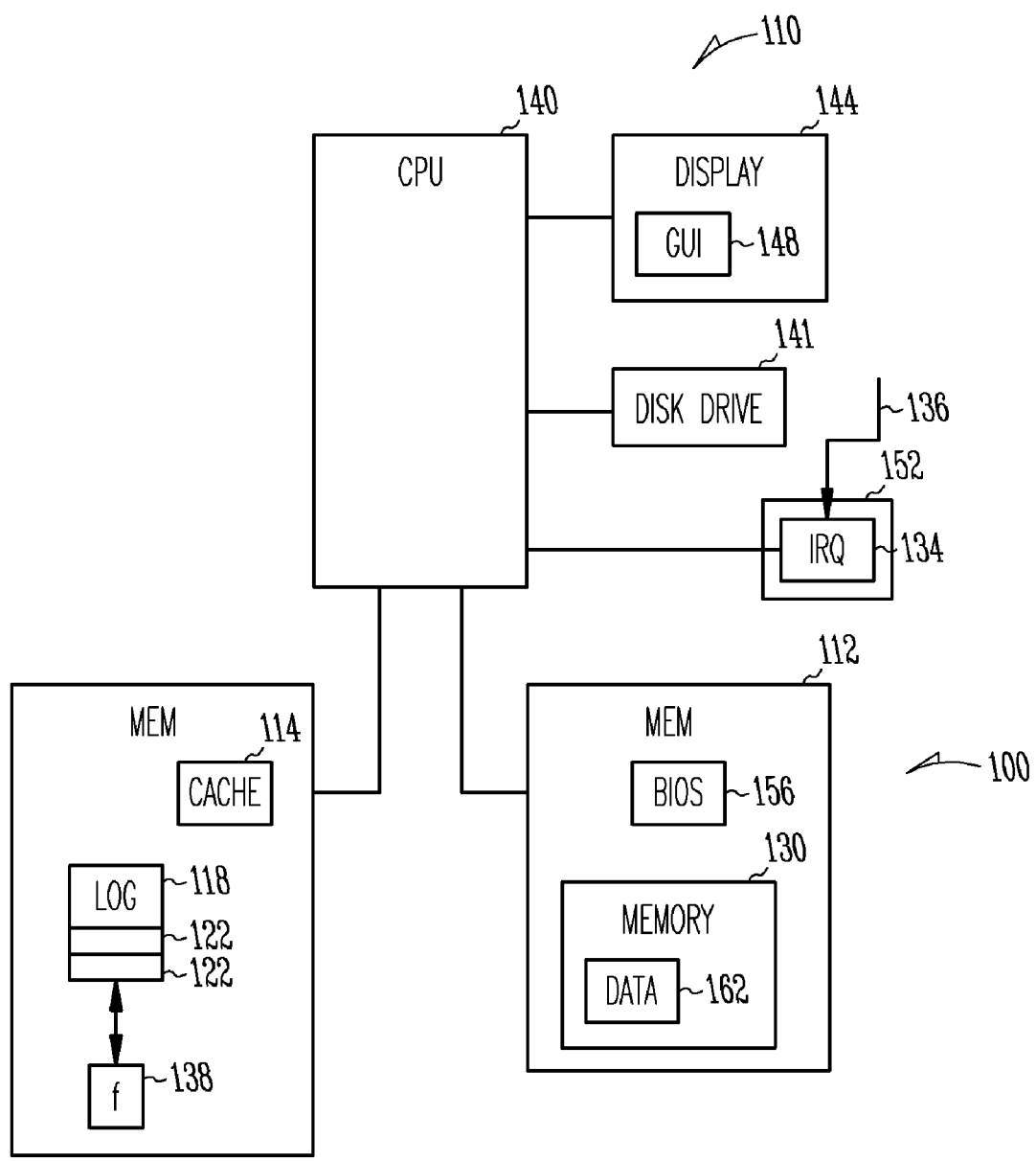
FIG. 1 is a block diagram of an apparatus, a system, and an article according to various embodiments.

FIG. 1 is a block diagram of apparatus 100, systems 110, and an article 112 according to various embodiments. The apparatus 100 may comprise a cache 114, which may be volatile or non-volatile, and a memory 118. The memory 118, which may also be volatile or non-volatile, can be used to store one or more addresses 122 associated with write operations to another memory 130 (cached by the cache 114) that occur prior to loading and/or executing an OS cache driver (not shown). The addresses 122 may be stored in the memory 118 in the form of a log.

If interrupts are trapped to detect write operations (e.g., the BIOS Intl3h interrupt), the apparatus 100 may also include an interrupt module 134 to receive an interrupt request 136 associated with write operations to the memory 130. The addresses 122 may be LBAs, for example, and the interrupt request 136 may be a hardware interrupt request or a software interrupt request, perhaps including or associated with the occurrence of a BIOS Intl3h interrupt.

The memories 114 and 130 may comprise any type of memory, including random access memory (RAM), polymer ferroelectric RAM (PFRAM), various kinds of programmable read only memory (PROM), magnetic or optical disks, etc. If the memory 118 is overrun by recording a number of addresses 122 that is larger than the log size, a flag 138 may be set to indicate the overrun condition.

For the purposes of this document, a memory is a volatile memory if the content stored therein is typically not retained when power is removed and re-applied to an associated processor. Non-volatile memory is any kind of memory that has the property of retaining content for a selected amount of time (e.g., several seconds or more) even when power applied to an associated microprocessor is cycled. Non-volatile memory includes, for example, battery-backed RAM, RAM backed by FLASH memory, and battery-backed RAM plus some other type of non-volatile storage, including a disk drive.

Other embodiments are possible. For example, a system 110 may comprise the apparatus 100, as described above, in combination with other elements. In an embodiment, the system 110 may comprise a processor 140 coupled to the apparatus 100, a disk drive 141 (typically comprising some form of non-volatile memory), and a display 144 coupled to the processor 140. The display 144 may be used to display a graphical user interface (GUI) 148.

The system 110 may include an interrupt module 134 to receive an interrupt request 136 associated with write operations to the memory 130. The module 134 may be included in a device option memory 152, or it may be implemented as part of a BIOS module 156. As noted previously, the memory 118 may be volatile or non-volatile, and it may be used to store a log having one or more memory addresses 122 associated with write operations to the memory 130.

The apparatus 100, systems 110, article 112, cache 114, memory 118, addresses 122, memory 130, interrupt module 134, interrupt request 136, flag 138, processor 140, disk drive 141, display 144, GUI 148, device option memory 152, and BIOS module 156 may all be characterized as "modules" herein. Such modules may include hardware circuitry and/or one or more processors and/or memory circuits, software program modules, including objects and collections of objects, and/or firmware, and combinations thereof, as desired by the architect of the apparatus 100, systems 110, and article 112, and as appropriate for particular implementations of various embodiments.

It should also be understood that the apparatus and systems of various embodiments can be used in applications other than for computers, and other than for systems that include displays and graphical user interfaces, and thus, various embodiments are not to be so limited. The illustrations of an apparatus 100 and a system 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others. Many different embodiments may be realized.

Figure 2:
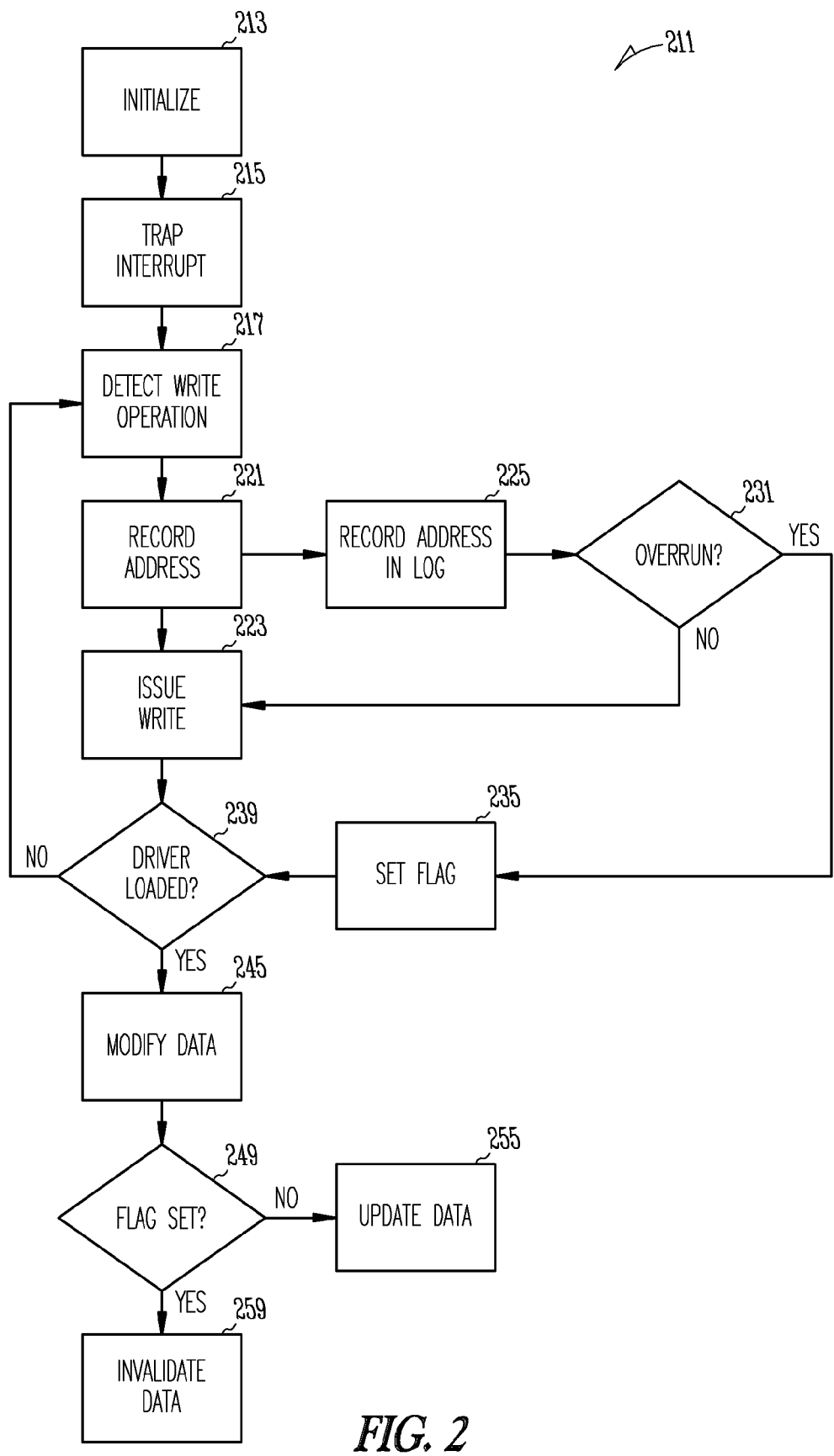
FIG. 2 is a flow chart illustrating several methods according to various embodiments.

For example, FIG. 2 is a flow chart illustrating several methods according to various embodiments. A method 211 may (optionally) begin with hardware initialization (e.g., the application of power to a processor) at block 213, and trapping an interrupt request, including a hardware or software interrupt request, at block 215.

The method 211 may then continue with detecting a write operation to a memory cached by a volatile or non-volatile cache at block 217, and then recording the address of the write operation prior to loading and/or executing an operating system cache driver at block 221. Thus, detecting the write operation at block 215 may include trapping an interrupt request at block 213. This activity may be followed with issuing a write to memory at block 223.

Recording the address of the write operation at block 221 may include recording the address in a log (which may be stored in a volatile or non-volatile memory, including a memory comprising at least one of a random access memory (RAM), including a static RAM (SRAM), a dynamic RAM (DRAM), a flash memory, and a polymer ferroelectric RAM (PFRAM) at block 225.

Since the log is typically of a limited size, it may be possible to overrun the log by recording write operations to a number of addresses that is larger than the log size. If the log is determined to be overrun at block 231, then the method 211 may include setting a flag to indicate an overrun of the log at block 235. Otherwise, the method may continue with issuing a write to memory at block 223, and determining whether an OS cache driver is loaded and/or executing at block 239. If the driver is not yet loaded and/or executing, other write operations to the cached memory may be detected at block 215. Otherwise, the method may continue with block 245.

The method 211 may thus include modifying data corresponding to the address of the write operation at block 245. If the log overrun flag is not determined to be set at block 249, modifying the data corresponding to the address of the write operation may comprise updating the data corresponding to the address of the write operation at block 255. If the log overrun flag is determined to be set at block 249, then modifying the data corresponding to the address of the write operation may comprise invalidating the data corresponding to the address of the write operation at block 259, which may include invalidating the cache if the flag is set. Alternatively, all of the data in the cache may be updated at block 259.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as COBOL, assembly, or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

FIG. 1 also illustrates an article 112 including a machine-accessible medium according to various embodiments. Thus, it is now apparent that another embodiment may include an article 112 such as a computer, a memory system, a magnetic or optical disk, some other storage device, and/or any type of electronic device or system, comprising a machine-accessible medium such as a memory 130 (e.g., a memory including an electrical, optical, or electromagnetic conductor) having associated data 162 (e.g., computer program instructions), which when accessed, results in a machine performing such actions as recording addresses of write operations to a memory cached by a non-volatile cache prior to executing an operating system cache driver, which may include recording the address of the write operation in a log.

The log may be included in a volatile or a non-volatile memory. If the log is overrun, the machine may act to set a flag, indicating the overrun condition. If the flag is set, the machine may also act to invalidate the cache, or update all of the data in the cache.

The ability to use a non-volatile cache can add versatility to the operation of a computer system, since the state of the cache can be maintained during system shutdown or power failure. Recording the occurrence of write requests associated with data stored in the non-volatile cache that occur prior to loading the cache driver may thus prevent data corruption after the driver begins execution, such that the cache data need not be invalidated.

Although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein, will be apparent to those of skill in the art upon reviewing the above description.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method in a computing system, comprising:
   monitoring for cache write activity performed to a non-volatile memory store in a period of time that a driver executable by the computing system is not providing access to the memory store, wherein the non-volatile memory store is coupled to the computing system, and wherein the cache write activity includes memory write activity performed independent of the driver executing in the computing system; and
   attempting a recordation of the cache write activity in a log responsive to occurrence of the cache write activity to the non-volatile memory store.

2. The method of claim 1, wherein the log is provided by a memory comprising at least one of: a static random access memory (SRAM), a dynamic random access memory (DRAM), a flash memory, or a polymer ferroelectric RAM (PFRAM).

3. The method of claim 1, wherein the recordation of the cache write activity includes storing in the log an address of a write operation performed by the cache write activity, wherein the non-volatile memory store is configured for a cache used by an operating system executing on the computing system, and wherein the driver is a cache driver provided by the operating system.

4. The method of claim 3, wherein the address of the write operation performed by the cache write activity is a logical block address.

5. The method of claim 3, further comprising:
   modifying data on the non-volatile memory store associated with the cache write activity responsive to performance of the cache write activity at the non-volatile memory store, wherein modifying the data includes invalidating data corresponding to a memory address of the write operation.

6. The method of claim 1, wherein monitoring for the cache write activity is performed by trapping an interrupt associated with disk access requests.

7. The method of claim 1, further comprising:
   determining whether recordation of the cache write activity in the log was successful; and
   modifying data on the non-volatile memory store responsive to determining the cache write activity was not successfully recorded in the log.

8. At least one computer readable storage medium comprising a plurality of instructions that, in response to being executed on a computing device, cause the computing device to:
   detect cache write activity to a non-volatile memory store provided by the computing device in a period of time that a driver executable by the computing device is not providing access to the memory store, wherein the cache write activity includes memory write activity performed independent of the driver executing in the computing device; and
   attempt a recordation of the cache write activity in a log.

9. The computer readable storage medium of claim 8, wherein the log is provided by a memory comprising at least one of: a static random access memory (SRAM), a dynamic random access memory (DRAM), a flash memory, or a polymer ferroelectric RAM (PFRAM).

10. The computer readable storage medium of claim 8, wherein instructions being executed on the computing device for recordation of the cache write activity include instructions to store, in the log, an address of a write operation performed by the cache write activity, and wherein the driver configured to access the non-volatile memory store is a cache driver provided by a operating system of the computing device.

11. The computer readable storage medium of claim 10, wherein the address of the write operation performed by the cache write activity is a logical block address.

12. The computer readable storage medium of claim 10, wherein the instructions being executed on the computing device further include instructions to:
   modify data on the non-volatile memory store associated with the cache write activity responsive to performance of the cache write activity at the non-volatile memory store, wherein operations to modify the data include operations to invalidate data corresponding to a memory address of the write operation.

13. The computer readable storage medium of claim 8, wherein instructions being executed on the computing device to detect the cache write activity include instructions causing the computing device to trap an interrupt request.

14. The computer readable storage medium of claim 8, wherein the instructions being executed on the computing device further include instructions to:
   determine whether recordation of the cache write activity in the log was successful; and
   modify data on the non-volatile memory store responsive to a determination that the cache write activity was not successfully recorded in the log.

15. A computing system, comprising:
   a processor;
   a non-volatile cache operably coupled to the processor; and
   a memory store configured to maintain a log of cache write activity occurring to the non-volatile cache;
   wherein the processor is configured to execute instructions to detect the cache write activity and record the cache write activity to the memory store, and wherein the cache write activity includes memory write activity to the non-volatile cache occurring independent of a driver executed by the processor in a period of time that the driver is not providing access to the memory store.

16. The computing system of claim 15, wherein the memory store configured to maintain a log of cache write activity comprises at least one of: a static random access memory (SRAM), a dynamic random access memory (DRAM), a flash memory, or a polymer ferroelectric RAM (PFRAM).

17. The computing system of claim 15, wherein the processor is further configured to execute instructions to store, in the log, an address of a write operation performed by the cache write activity, and wherein the driver configured to access the non-volatile memory store is a cache driver provided by a operating system of the computing system.

18. The computing system of claim 17, wherein the address of the write operation performed by the cache write activity is a logical block address.

19. The computing system of claim 17, wherein the processor is further configured to execute instructions to: modify data on the non-volatile memory store associated with the cache write activity responsive to performance of the cache write activity at the non-volatile memory store, wherein operations to modify the data include invalidating data corresponding to the memory address of the write operation.

20. The computing system of claim 15, wherein the processor is further configured to execute instructions to detect the cache write activity by trapping an interrupt request.

21. The computing system of claim 15, wherein the processor is further configured to execute instructions to:
determine whether recordation of the cache write activity in the log was successful; and modify data on the non-volatile memory store responsive to a determination that the cache write activity was not successfully recorded in the log.

* * * * *